(12) United States Patent
Lopes De Castro et al.

(10) Patent No.: US 10,711,918 B2
(45) Date of Patent: Jul. 14, 2020

(54) DEFLECTOR INTENDED TO GUIDE A LINE AND RELATED GUIDING ASSEMBLY

(71) Applicant: TECHNIP FRANCE, Courbevoie (FR)

(72) Inventors: Mário Augusto Lopes De Castro, Rio de Janeiro (BR); Jucimar Coelho Moza, Rio de Janeiro (BR); Leonardo-Alexandre Lucena, Rio de Janeiro (BR); Carolina-Paiva Nascimento, Rio de Janeiro (BR); José-Roberto Correa, Rio de Janeiro (BR); Paula Duarte, Rio de Janeiro (BR); Paulo-Webber Gil, Rio de Janeiro (BR); Luis Paulo Ferreira, Rio de Janeiro (BR); Carlos-Filipe Santos, Rio de Janeiro (BR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 16/331,550

(22) PCT Filed: Sep. 8, 2017

(86) PCT No.: PCT/EP2017/072611
§ 371 (c)(1),
(2) Date: Mar. 8, 2019

(87) PCT Pub. No.: WO2018/046675
PCT Pub. Date: Mar. 15, 2018

(65) Prior Publication Data
US 2019/0211946 A1 Jul. 11, 2019

(30) Foreign Application Priority Data
Sep. 9, 2016 (EP) .................................... 16306137

(51) Int. Cl.
*F16L 1/235* (2006.01)
*H02G 9/02* (2006.01)
*H02G 1/10* (2006.01)

(52) U.S. Cl.
CPC ................ *F16L 1/235* (2013.01); *H02G 1/10* (2013.01); *H02G 9/02* (2013.01)

(58) Field of Classification Search
CPC ... F16L 1/225; F16L 1/18; F16L 1/235; F16L 1/23; H02G 1/10; H02G 9/02; E21B 19/22
See application file for complete search history.

(56) References Cited

U.S. PATENT DOCUMENTS 5,011,333 A * 4/1991 Lanan ..................... F16L 1/225
405/166
5,630,678 A * 5/1997 Branchut ................. F16L 1/18
405/166

(Continued)

FOREIGN PATENT DOCUMENTS

EP 0 717 222 A1 6/1996
WO WO 96/08605 A2 3/1996

(Continued)

OTHER PUBLICATIONS

International Search Report dated Nov. 20, 2017 in corresponding PCT International Application No. PCT/EP2017/072611.

(Continued)

*Primary Examiner* — Carib A Oquendo
(74) *Attorney, Agent, or Firm* — Ostrolenk Faber LLP (57) ABSTRACT

A deflector (38) including: a support (70); an intermediate member (72), pivotally mounted in the support (70) around a first rotation axis (B-B'); at least a secondary pivoting member (74), pivotally connected to the intermediate member (72) around a second rotation axis (C-C') parallel to the first rotation axis (B-B'); for each secondary pivoting mem- (Continued)

ber (74), at least a pair of rotating members (76). Each rotating member (76) is connected to the secondary pivoting member (74). The deflector (38) including: a guiding mechanism, for guiding each rotating member (76) in translation with regard to the support (70) along a translation axis (D-D') non parallel to the first rotation axis (B-B'); a connecting member (78), pivotally mounted to the secondary pivoting member (74). The rotating member (76) is rotatably mounted on the connecting member (78) around a rotating member rotation axis (E-E').

15 Claims, 6 Drawing Sheets

(56) References Cited

U.S. PATENT DOCUMENTS

| | | | |
|---|---|---|---|
| 6,719,008 B1 | 4/2004 | LeDevehat | 137/615 |
| 2010/0034592 A1* | 2/2010 | Roodenburg | F16L 1/23 |
| | | | 405/169 |
| 2011/0033243 A1* | 2/2011 | Roodenburg | B65H 51/105 |
| | | | 405/168.4 |
| 2011/0081204 A1* | 4/2011 | van Grieken | B63B 35/03 |
| | | | 405/167 |
| 2014/0034887 A1* | 2/2014 | Fetters, III | B66D 1/28 |
| | | | 254/266 |

FOREIGN PATENT DOCUMENTS

| | | |
|---|---|---|
| WO | WO 2009/098586 A2 | 8/2009 |
| WO | WO 2009/148297 A1 | 12/2009 |

OTHER PUBLICATIONS

Written Opinion dated Nov. 20, 2017 in corresponding PCT International Application No. PCT/EP2017/072611.

Extended European Search Report dated Mar. 2, 2017 in corresponding European Patent Application No. 16306137.7.

* cited by examiner

DEFLECTOR INTENDED TO GUIDE A LINE AND RELATED GUIDING ASSEMBLY

CROSS-REFERENCE TO RELATED APPLICATIONS

The present application is a 35 U.S.C. §§ 371 national phase conversion of PCT/EP2017/072611, filed Sep. 8, 2017, which claims priority to European Patent Application No. 16306137.7, filed Sep. 9, 2016, the contents of which are incorporated herein by reference. The PCT International Application was published in the English language.

TECHNICAL FIELD OF THE INVENTION

The present invention concerns a deflector, intended to guide a line, in particular a line introduced in a body of water, comprising:
   a support;
   an intermediate member, pivotally mounted in the support around a first rotation axis;
   at least a secondary pivoting member, pivotally connected to the intermediate member around a second rotation axis parallel to the first rotation axis;
   for each secondary pivoting member, at least a pair of rotating members, each rotating member being connected to the secondary pivoting member.

BACKGROUND OF THE INVENTION

Such a deflector is intended to be used for guiding a line moving in an installation, notably in an installation for laying or/and recovering a line. The installation is for example a laying vessel or an offshore platform able to lay a line in a body of water from the surface of the body of water. In other applications, the installation is in a shipyard or is located onshore.

The line moved in the installation is advantageously a flexible pipe, in particular an unbonded flexible pipe or a bonded flexible pipe. A flexible pipe is for example a pipe according to the standards API 17J (Specification for Unbonded Flexible Pipe) and API RP 17B (Recommended Practice for Flexible Pipe) established by the American Petroleum Institute. In a variant, the line moved in the installation is a rigid pipe, an umbilical, or a cable.

The laying of a pipe from a vessel generally implies guiding the pipe into the body of water from a laying tower located on the laying vessel. Generally, the pipe is passed on the laying tower, and guided into the water, either through a moon pool located at the center of the vessel (for example in J-lay method) or at the back of the vessel (for example in S-lay method).

The pipe needs to be accurately guided to ensure correct positioning when it enters the body of water, to warrant structural integrity of the pipe and/or to promote forced direction changing of the pipe.

Accordingly, deflectors have been widely used to guide pipes during laying operations. Some deflectors are fixed. Other deflectors comprise rollers or moving tracks.

In some cases, over bending of the pipe may occur at the deflector. In such occurrences, the force distribution applying on the pipe may concentrate on very limited regions of the pipe. This leads to an increase in the stress applied to the pipe, and may damage the pipe in case of excess friction. Such damages may irreversibly affect the pipe operation and shorten its service life.

U.S. Pat. No. 6,719,008 discloses an offshore loading system in which a pipe is suspended between two vessels. A deflector comprising a support, an intermediate member pivotally mounted on the support and a pair of rotating members each connected to a secondary pivoting member are supported on a cable. This assembly adapts to the shape of the cable. It nevertheless lacks robustness to be used as a deflector in a pipe laying installation.

SUMMARY OF THE INVENTION

One aim of the invention is to provide a deflector adapted for guiding a line being moved in particular in a body of water, which has a simple structure and which greatly reduces the risk of damaging the line.

To this aim, the subject-matter of the invention is a deflector of the above type, wherein the deflector comprises, for each rotating member:
   a guiding mechanism, for guiding each rotating member in translation with regard to the support along a translation axis non parallel to the first rotation axis;
   a connecting member, pivotally mounted with regards to the secondary pivoting member, the rotating member being rotatably mounted on the connecting member around a rotating member rotation axis.

The deflector according to the invention comprises one or more of the following features, taken solely, or according to any technical feasible combination:
   each rotating member is able to move in translation exclusively along the translation axis;
   the rotation axis of each rotating member is fixed with regards to the support;
   it comprises at least two secondary pivoting members, mounted on opposite sides of the intermediate member in reference to the first rotation axis, each secondary pivoting member being connected to at least a pair of rotating members;
   it comprises, for each secondary pivoting member, at least two connecting members pivotally mounted on opposite sides of the secondary pivoting member;
   one of the intermediate member and of the support defines a slot, the other one of the intermediate member and of the support comprising a rod inserted in the slot;
   for each connecting member, one of the secondary pivoting member and of the connecting member defines an oblong hole, the other one of the connecting member and of the secondary pivoting member comprising a pivot inserted in the oblong hole;
   the support defines an auxiliary guiding path for guiding the pivot in translation;
   the guiding mechanism comprises, for each rotating member, at least a protrusion connected to one of the rotating member and of the support, the other one of the rotating member and of the support defining a guiding slide receiving the protrusion, the guiding slide extending along the translation axis;
   the support comprises two side plates and a transverse cross member connecting the side plates, the intermediate member, the at least one secondary pivoting member, and the at least one pair of rotating members being received between the two side plates;
   it comprises at least a tertiary pivoting member inserted between the intermediate member and the secondary pivoting member, the tertiary pivoting member being pivotally connected to the intermediate member and to the secondary pivoting member;

the guiding mechanism comprises at least an adjustable stop, able to block the translation of the rotating member along the translation axis;

it comprises at least a sensor able to measure the position of the rotating member along the translation axis;

each rotating member defines a groove for receiving the line;

each rotating member comprises peripheral teeth, the deflector comprising an endless member engaged with the teeth of each rotating member.

The invention further concerns a line guiding assembly in an offshore or onshore or subsea installation, the line guiding assembly comprising:

a central supporting ring, defining a central lumen in which the line is intended to go through;

two supporting beams, mounted free in rotation on the central ring, the supporting beams laying on an upper supporting surface defined on the central ring, the supporting beams protruding radially beyond the outer circumference of the central ring;

a deflector as defined above, carried by each supporting beam.

The guiding assembly according to the invention may comprise one or more of the following features, taken solely, or according to any technical feasible combination:

it comprises two parallel supporting beams, each supporting beam laying on an upper supporting surface of the central ring, and a cross member connecting the two parallel supporting beams, the deflector being mounted between the two parallel supporting beams.

The invention also concerns an offshore or onshore or subsea installation comprising a guiding assembly as defined above.

The invention also relates to a line guiding assembly in an offshore or onshore or subsea installation, the line guiding assembly comprising:

a central supporting ring, defining a central lumen in which the line is intended to go through;

a pair of support beams, mounted free in rotation on the central ring, the support beams laying on an upper supporting surface defined on the central ring, the support beams protruding radially beyond the outer circumference of the central ring;

a line deflector, carried by each support beam.

The deflector is not necessarily as described above.

BRIEF DESCRIPTION OF THE DRAWINGS

The invention will be better understood, upon reading of the following description, given solely as an example, and made in reference to the appended drawings, in which.

DETAILED DESCRIPTION OF SOME EMBODIMENTS

Figure 1:
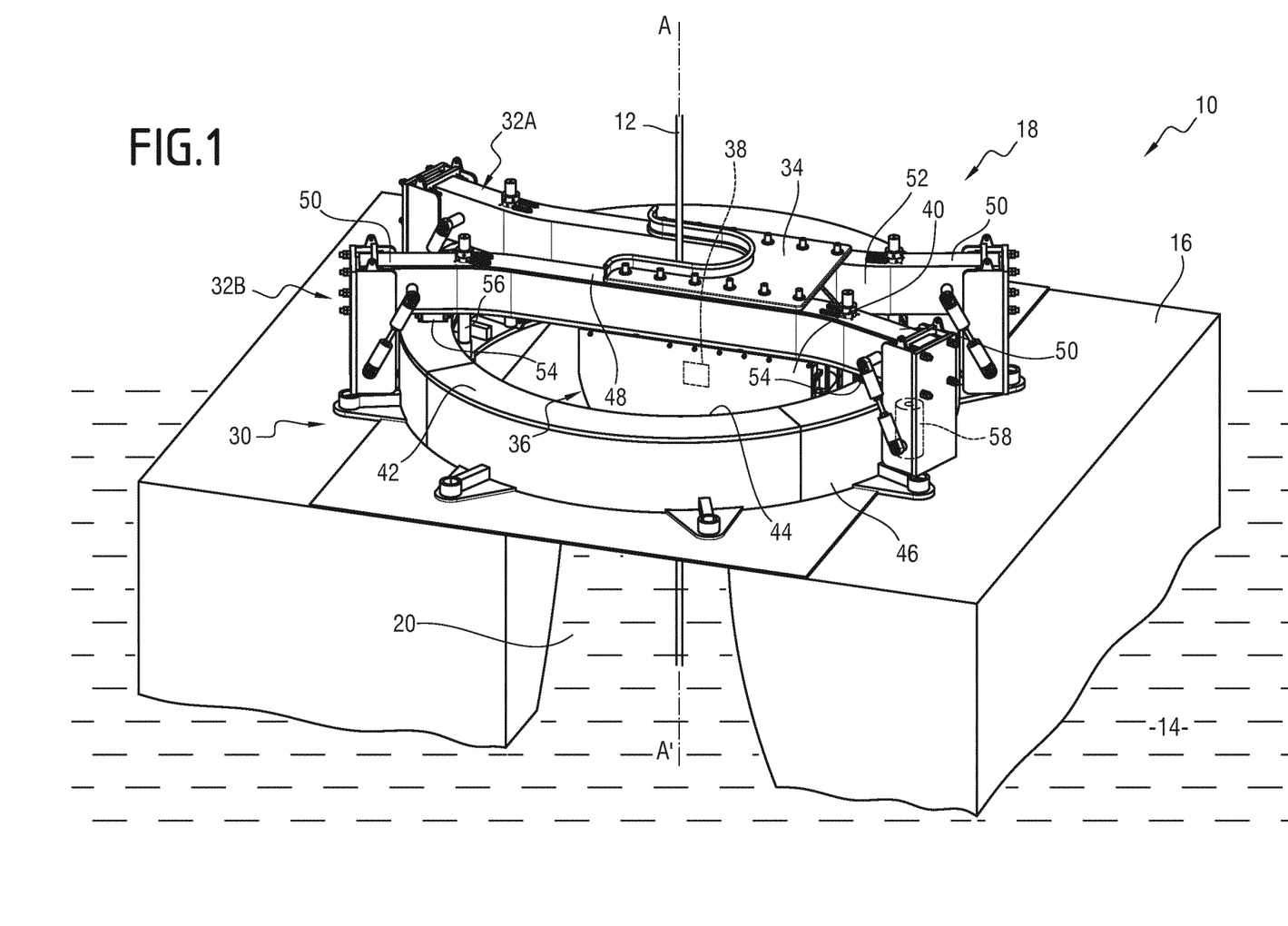
FIG. 1 is a schematic perspective view of an installation for laying a line comprising a guiding assembly according to the invention.

An installation 10 according to the invention is shown schematically in FIG. 1. The installation 10 is here a line laying installation intended for laying a line 12 in a body of water 14.

The line 12 is for example a flexible pipe, in particular an unbonded or a bonded flexible pipe such as disclosed in Standards API 17J (Specification for Unbonded Flexible Pipe) and API RP 17B (Recommended Practice for Flexible Pipe) established by the American Petroleum Institute.

In variant, the line 12 is an umbilical, an integrated production bundle, and/or a cable. In other variants, the line 12 is a rigid pipe made of at least one, preferably several assembled sections of rigid tubing.

The body of water 14 is for example a sea, an ocean, a lake and/or a river. The depth of the body of water 14, taken from the surface to the bottom of the body of water 14 at the laying site is generally comprised between 50 m and 3000 m.

The installation 10 comprises a surface assembly 16, at the surface of the body of water 14, a laying tower (not shown), placed on the surface assembly 16 to drive the line out of the surface assembly 16, and an assembly 18 for guiding the line into the body of water 14.

The surface assembly 16 here comprises a central vertical opening 20 or "moon pool" opening downwardly in the body of water 14. In a variant, the surface assembly 16 comprises a supporting structure on one side of the surface assembly 16 which protrudes above the body of water 14.

The guiding assembly 18 is here located above the central opening 20, or on the supporting structure. It comprises a central supporting ring 30 extending around a central axis A-A', a pair of supporting beams 32A, 32B mounted free in rotation around the central axis A-A' on the supporting ring 30 and a cross-member 34 connecting together the supporting beams 32.

The guiding assembly 18 further comprises a cradle 36, carried by the supporting beams 32A, 32B and a deflector 38 according to the invention, mounted in the cradle 36.

The supporting ring 30 delimits a central lumen 40, located above the body of water 14. The supporting ring 30 defines an upper supporting surface 42, an inner circumferential surface 44 and an outer circumferential surface 46.

The supporting ring 30 is fixedly mounted on the surface assembly 16, for example on a deck of the surface assembly 16.

In the example of FIG. 1, the supporting ring 30 is made in several segments assembled together, for example four segments. In a variant (not shown), the supporting ring 30 is made in one piece.

Each beam 32A, 32B extends transversely to the axis A-A' above the supporting ring 30. It lays on the upper surface 42 of the supporting ring 30.

Each beam 32A, 32B here has a central linear section 48 and two opposite end sections 50 diverging from the central section 48, away from the other beam 32B, 32A.

At least one end section 50 of each beam 32A, 32B protrudes radially beyond the supporting ring 30, beyond the outer circumferential surface 46.

The central sections 48 of the beams 32A, 32B are substantially parallel to one another. The beams 32A, 32B delimit between them a central passage 52 containing the central axis A-A' of the ring 30.

Each beam 32A, 32B is equipped with rollers 54, 56, 58 protruding downwardly on the supporting ring 30 from an end section 50.

Each end section 50 is equipped with at least a roller 54 substantially horizontal to roll on the upper supporting surface 42. It is also equipped with an inner substantially vertical roller 56 to roll on the inner circumferential surface 44. Additionally, at least one of the end sections 50 is equipped with an outer substantially vertical roller 58 to roll on the outer circumferential surface 46, the outer roller 58 protruding downwards from the protruding part of the end section 50.

The cross-member 34 rigidly connects the beams 32A, 32B transversely. The beams 32A, 32B and the cross-member 34 are thus jointly movable in rotation around axis A-A', relative to the supporting ring 30. In this example, the cross-member 34 extends between the upper surfaces of each beam 32A, 32B above the central linear section 48, on one side of the central axis A-A'.

The cradle 36 comprises side plates, each connected to a respective beam 32A, 32B.

The assembly comprising the beams 32A, 32B, the cross-member 34, the cradle 36 and the deflector 38 is able to freely rotate around axis A-A' on the supporting ring 30 over an angle which is greater than 360°. It adapts automatically to the configuration of the line 12, especially to its relative orientation in the region between the body of water 14 and the surface assembly 16.

Figure 2:
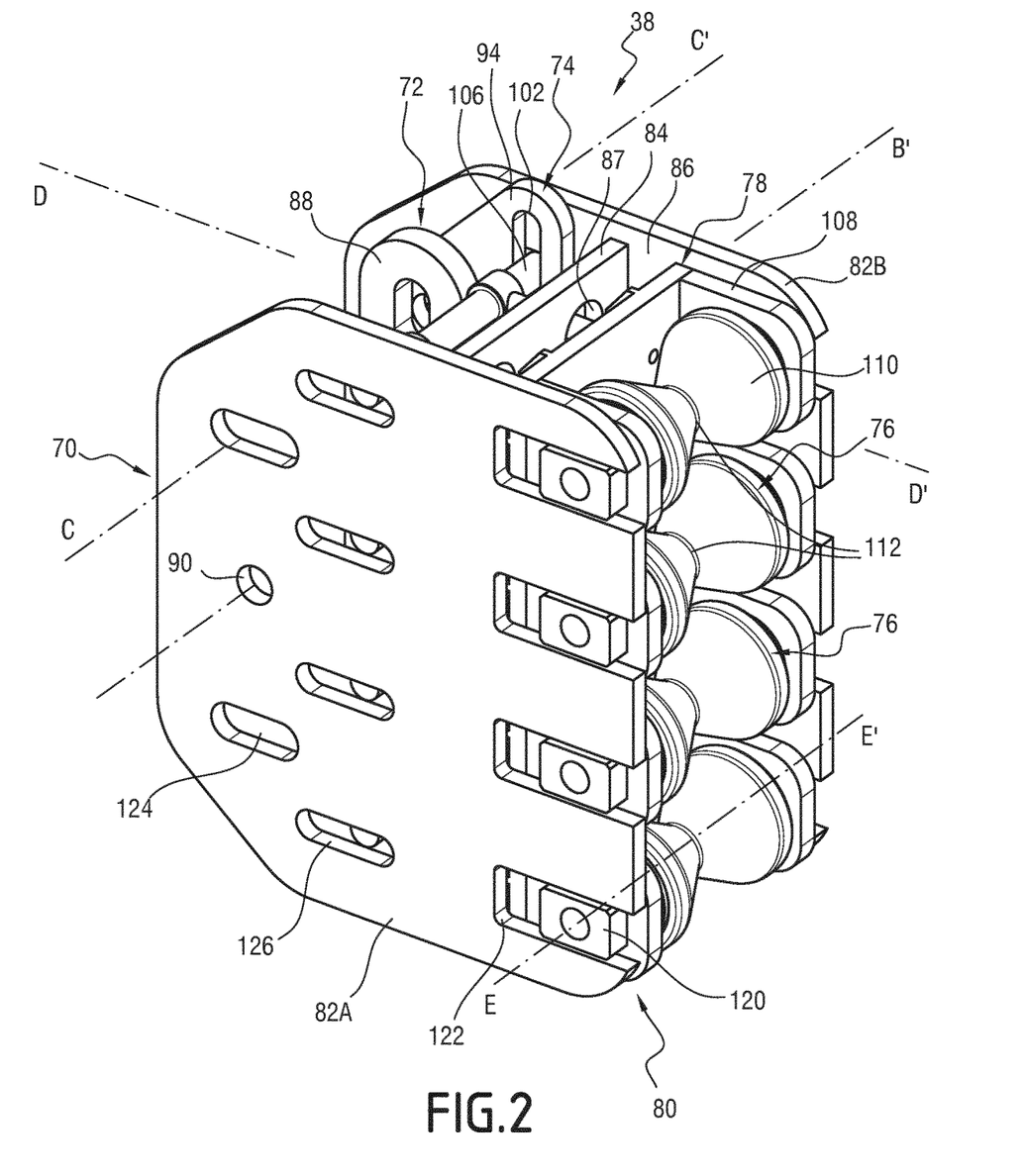
FIG. 2 is a perspective view of a deflector according to the invention, mounted in the guiding assembly of FIG. 1.
Figure 3:
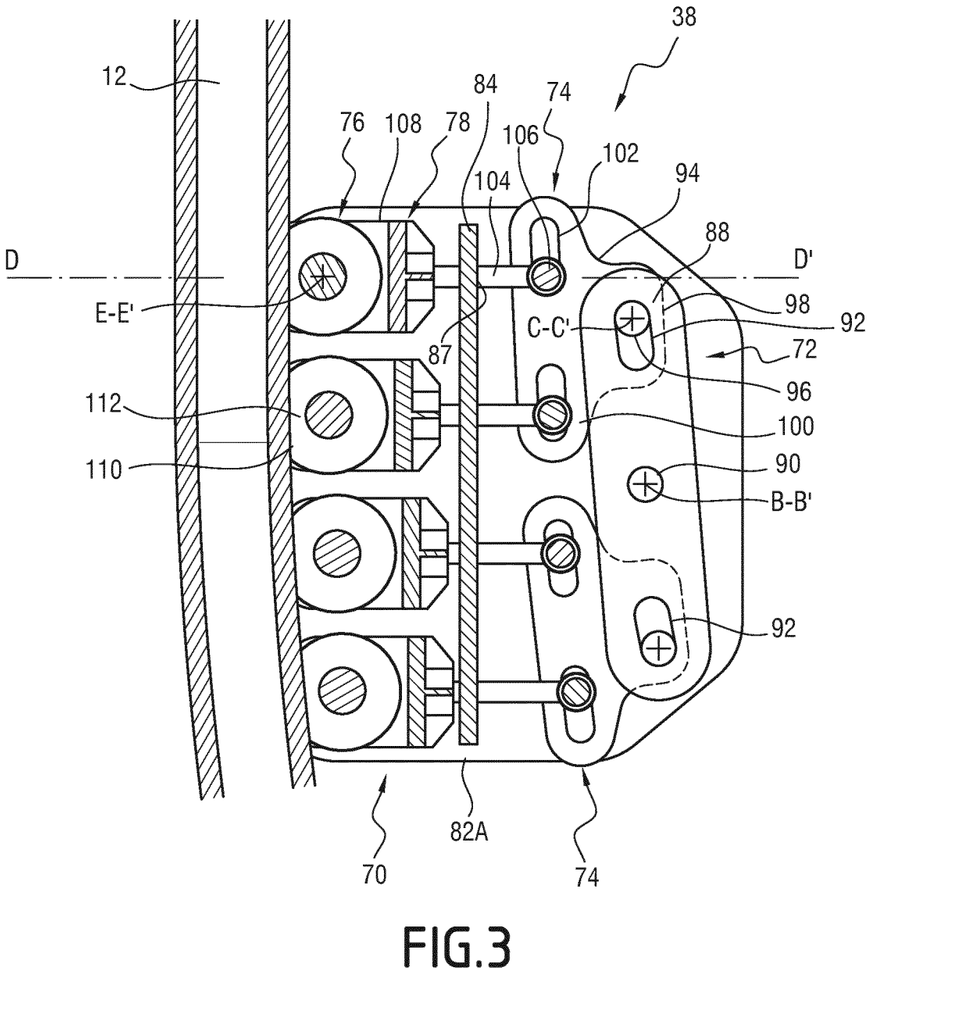
FIG. 3 is a median cross-section of the deflector of FIG. 2.
Figure 4:
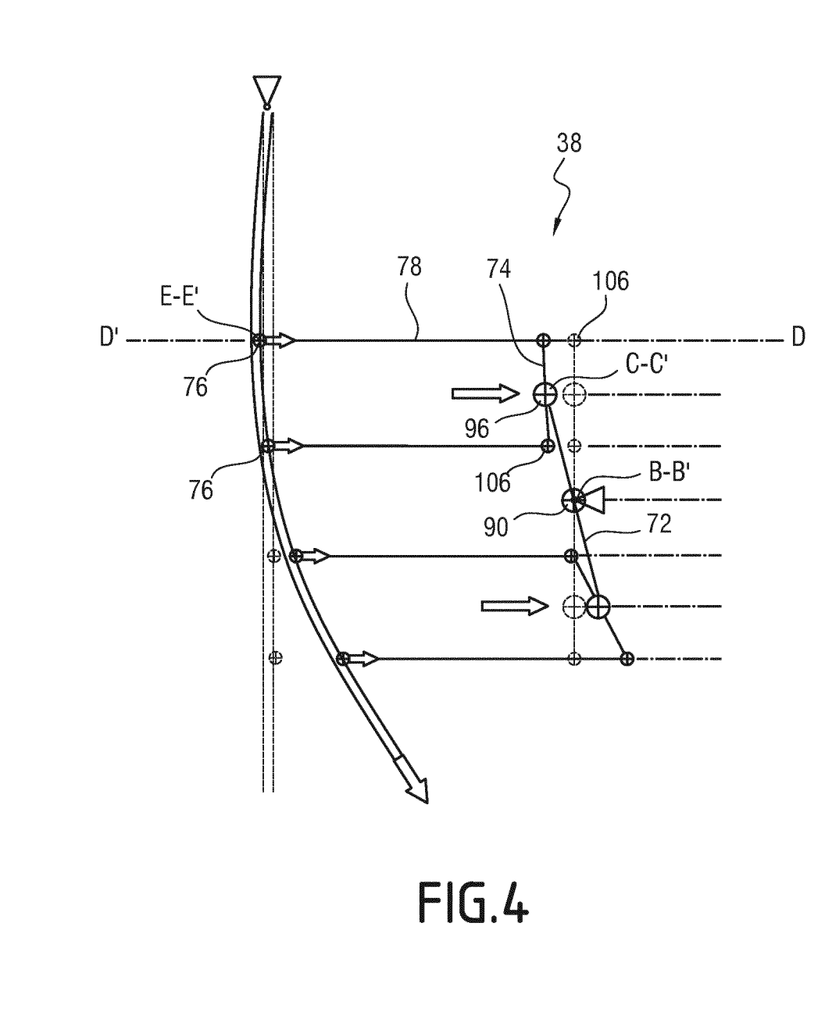
FIG. 4 is a schematic kinetic scheme of the deflector of FIG. 2.

In reference to FIGS. 2 to 4, the deflector 38 comprises a support 70 fixed on the cradle 36, at least an intermediate member 72 pivotably mounted on the support 70 around a first rotation axis B-B' and at least a pair of secondary pivoting members 74, preferably two pairs of secondary pivoting members 74, pivotably connected to the intermediate member 72, each secondary member 74 pivoting along a second rotation axis C-C' parallel to the first rotation axis B-B'.

The deflector 38 further comprises, for each secondary pivoting member 74, a pair of rotating members 76 connected to the secondary pivoting member 74, and for each rotating member 76, a connecting member 78 connecting the rotating member 76 to the secondary pivoting member 74.

According to the invention, the deflector 38 also includes a guiding mechanism 80 (visible in FIG. 2) for guiding each rotating member 76 and each connecting member 78 in translation with regard to the support 70 along a respective translation axis D-D' non parallel to the first axis B-B'.

As shown in FIG. 2, the support 70 comprises two parallel side plates 82A, 82B, orthogonal to the first rotation axis B-B'. It also includes at least a transverse cross-member 84 connecting the side plates 82A, 82B together.

In the orientation of FIG. 2, the plates 82A, 82B extend substantially vertically. They define an intermediate space 86 in which the intermediate member 72, the secondary pivoting member 74, the rotating members 76 and the connecting members 78 are positioned.

The transverse cross-member 84 connects the two side plates 82A, 82B through the intermediate space 86. The intermediate cross-member defines a plurality of trough holes 87, through which the connecting members 78 are engaged.

The intermediate member 72 is formed of a pivoting bar 88 pivotably mounted on the support 70 through an axle 90 connected to the side plates 82A, 82B.

The pivoting bar 88 defines, for each pair of secondary pivoting members 74, a slot 92 located on one side of the first rotation axis B-B'. In the example of FIG. 2, in which the deflector 38 comprises two pairs of secondary pivoting member 74, the pivoting bar 88 defines two opposite slots 92 located on opposite sides of the first rotation axis B-B'.

Each slot 92 extends longitudinally along the pivoting bar 88.

In the example of FIG. 2, each pair of secondary pivoting member 74 comprises a secondary pivoting member 74 on each lateral side of the intermediate member 72, inserted between the intermediate member 72 and a respective side plate 82A, 82B, facing a slot 92. The secondary pivoting members 74 of each pair of secondary pivoting members 74 are each connected to the same pair of rotating members 76.

As shown in FIG. 3, each secondary pivoting member 74 comprises a plate 94 and a rod 96 mounted in the plate 94 to hinge the plate 94 to the intermediate member 72.

The plate 94 has a substantially T-shape, with a narrower region 98 locating facing the intermediate member 72 and a wider region 100 protruding from the intermediate member 72 towards the rotating members 76.

The rod 96 protrudes laterally from the narrower region 98, parallel to the first rotation axis B-B'. It is received in the slot 92 of the intermediate member 72.

The wider regions 100 define, for each rotating member 76, an oblong hole 102 receiving the connecting member 78.

Each connecting member 78 comprises a bar 104, a pivot 106 inserted in the oblong hole 102 and a half-clevis 108 receiving the rotating member 76.

The pivot 106 protrudes laterally at one end of the bar 104. The half-clevis 108 protrudes longitudinally at another end of the bar 104.

Each rotating member 76 defines a surface 110 for contacting the line 12. The surface 110 here delimits a central groove 112 for receiving the line 12.

Each rotating member 76 is rotatably mounted on the connecting member 78, at the half-clevis 108, around a rotating member rotation axis E-E', parallel to the first rotation axis B-B' and to the second rotation axis C-C'.

As shown in FIG. 2, the guiding mechanism 80 comprises at least a protrusion 120 jointly movable with each rotating member 76, and for each protrusion 120, a guiding slide 122 defined in the support 70.

The guiding mechanism 80 further comprises at least a secondary guiding path 124 for guiding in translation the rod 96 of each secondary pivoting member 74 and an additional guiding path 126 for guiding the pivot 106 of each connecting member 78 in translation along an axis parallel to the translation axis D-D'.

In the example of FIG. 2, the guiding mechanism 80 comprises, for each rotating member 76, two opposite protrusions 120 jointly movable in translation with the rotating member 76. The opposite protrusions 120 are located on opposite sides of the rotating member 76, here on the outer surfaces of each half-clevis 108.

Each guiding slide 122 is formed in a respective side plate 82A, 82B of the support 70. The guiding slide 122 is here a notch emerging longitudinally out of the side plate 82A, 82B.

The notch has a shape partially complementary to the shape of the protrusion 120, to limit the movement of the protrusion 120 along the translation axis D-D'. The translation axis D-D' is perpendicular to the rotating member rotation axis E-E'. By cooperation of the protrusion 120 in the guiding slide 122, each rotating member 76 is able to move in translation exclusively along the translation axis D-D'.

The secondary guiding path 124 comprises, for each secondary pivoting member 74, an oblong through-hole made in a side plate 82A, 82B of the support 70. The oblong through-hole extends along an axis parallel to the translation axis D-D'.

The additional guiding path 126 is also made of an oblong through-hole vertically and horizontally shifted with regards to each secondary guiding path 124. It receives the pivot 106 of a connecting member 78.

The oblong through-hole extends along the translation axis D-D' of the rotating member 76 to which the connecting member 78 is connected.

The connecting member 78 is thus able to move in translation with regard to the support 70, only along the translation axis D-D'.

The operation of the guiding assembly 18 according to the invention, during the moving of a line 12 in a body of water 14 will be now described.

Initially, as shown in FIG. 1, the line 12 is vertically introduced into the central passage 52 defined between the beams 32A, 32B. It is lowered to the body of water 14.

The deflector 38 is in a rest initial configuration shown in dotted lines in FIG. 4. In this configuration, the intermediate member 72 is substantially vertical. The pairs of secondary pivoting members 74 are vertically aligned on top of one another. The rotating members 76 are also aligned vertically.

When the line 12 bends, as shown in FIG. 4, its outer surface applies on the deflector 38. More precisely, the outer surface of the line 12 contacts the rotating members 76 in the grooves 112 defined in each rotating member 76.

Each of the rotating members 76 translate along their translation axis D-D' to adapt to the local shape of the line 12. The translation movement of each rotating member 76 is transmitted to the secondary pivoting members 74 through the connecting members 78, which translate accordingly. The movement of the rotating members 76 and of the connecting members 78 is guided by the translation of the protrusions 120 in the guiding slides 122 and by the translation of the pivots 106 in the additional guiding paths 126 and in the oblong holes 102.

Depending on the relative position of each secondary pivoting member 74, the intermediate member 72 pivots around the first rotation axis B-B'.

In the example of FIGS. 3 and 4, the secondary pivoting members 74 in the upper region of the support 70 shift out of the support 70 towards the central axis A-A' of the guiding assembly 18, whereas the secondary pivoting members 74 in the lower region of the support 70 shift in the support 70, away from the central axis A-A'.

The deflector 38 thus auto-adapts to the shape of the line 12, without external intervention or control.

Additionally, if a torsion force occurs on the line 12, the assembly of the beams 32A, 32B, cross-member 34 and deflector 38 pivots around the central axis A-A' to adapt to the shape of the line 12.

As a consequence, the forces applying on the line 12 by each rotating member 76 balance and are equal in module and direction, as shown in FIG. 4.

This effect is obtained whichever rotating member 76 touches the line 12 first, due to the transmission of force by translation of the rotating members 76 and of the connecting members 78 and by respective pivotal of the secondary pivoting members 74 and of the intermediate member 72 around their respective rotation axis C-C' and B-B'.

Equal force distribution along the entire contact path between the line 12 and the deflector 38 thus occurs, which leads to better load distribution on the line 12 and consequent mitigation of stress concentrations, whatever the radius of curvature of the line 12 in the contact region at each instant. This greatly improves the fatigue properties in dynamic applications.

The deflector 38 is therefore very flexible. As a consequence, product integrity is guaranteed and operational costs are reduced.

Figure 5:
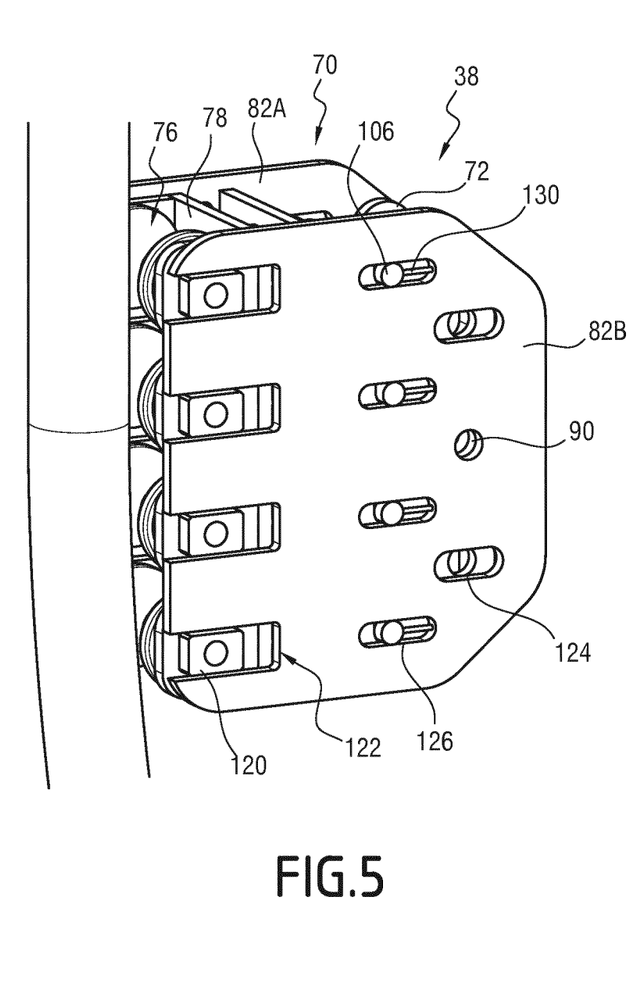
FIG. 5 is a view similar to FIG. 2, illustrating a second deflector according to the invention.

The deflector 38 of a variant of guiding assembly 18 according to the invention is shown in FIG. 5. The deflector 38 shown in FIG. 5 differs from the deflector 38 shown in FIGS. 2 and 3 in that it further comprises sensors 130 for sensing the displacement of each rotating member 76 in translation with regard to the support 70.

The sensor 130 is for example a Linear Variable Differential Transformer (LVDT), which produces an electrical signal representative of the displacement.

In the example of FIG. 5, each sensor 130 is jointly movable with the rotating member 76. It is for example connected to the connecting member 78, advantageously at the pivot 106.

Each sensor 130 is also connected to a calculation unit (not shown) which is able to determine the position of each rotating member 76 in the support 70 at each instant. From these positions, the calculation unit deduces and monitors the local bending radius of the line 12 in the deflector 38.

Figure 6:
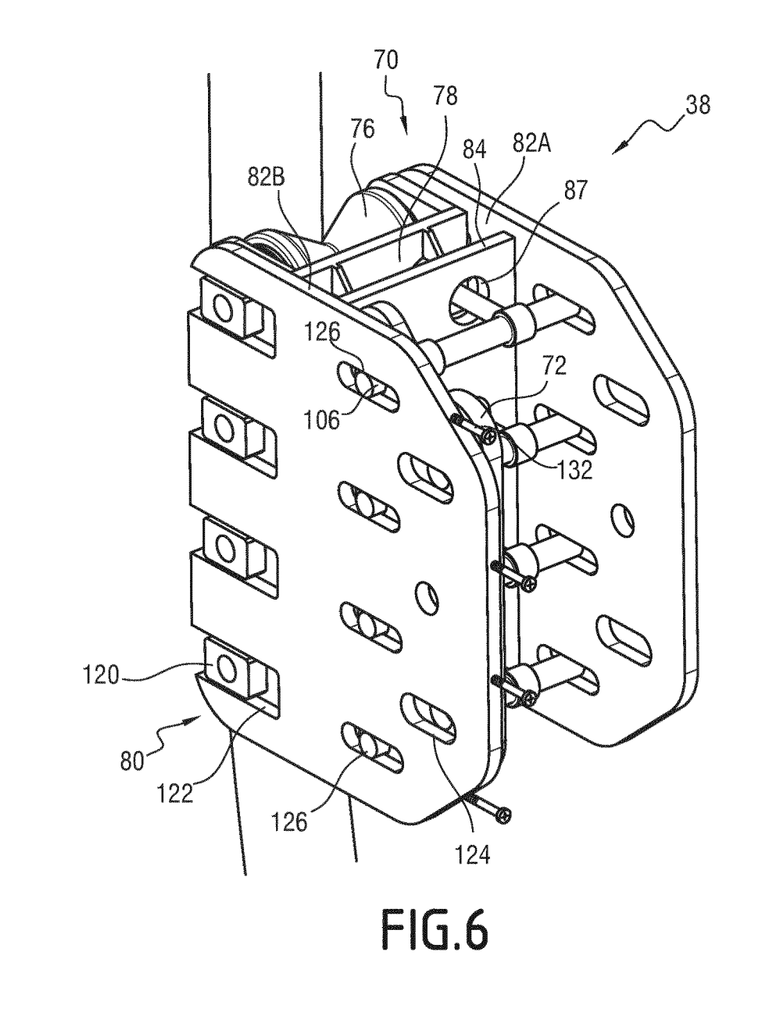
FIG. 6 is a view similar to FIG. 2 illustrating a third deflector according to the invention.

In a variation shown in FIG. 6, the deflector 38 includes adjustable stops 132 able to limit the translation of each rotating member 76 away from the axis A-A'.

Each adjustable stop 132 is for example made of an adjustable screw, protruding in each additional guiding path 126, to limit the travel of the connecting member 78 along its translation axis D-D'. The length of the protruding part of the screw into the additional guiding path 126 is adjustable to adjust the maximum travel of the connecting member 78.

The use of adjustable stops 132 allows a control of the minimum bending radius which can apply on the line 12.

Figure 7:
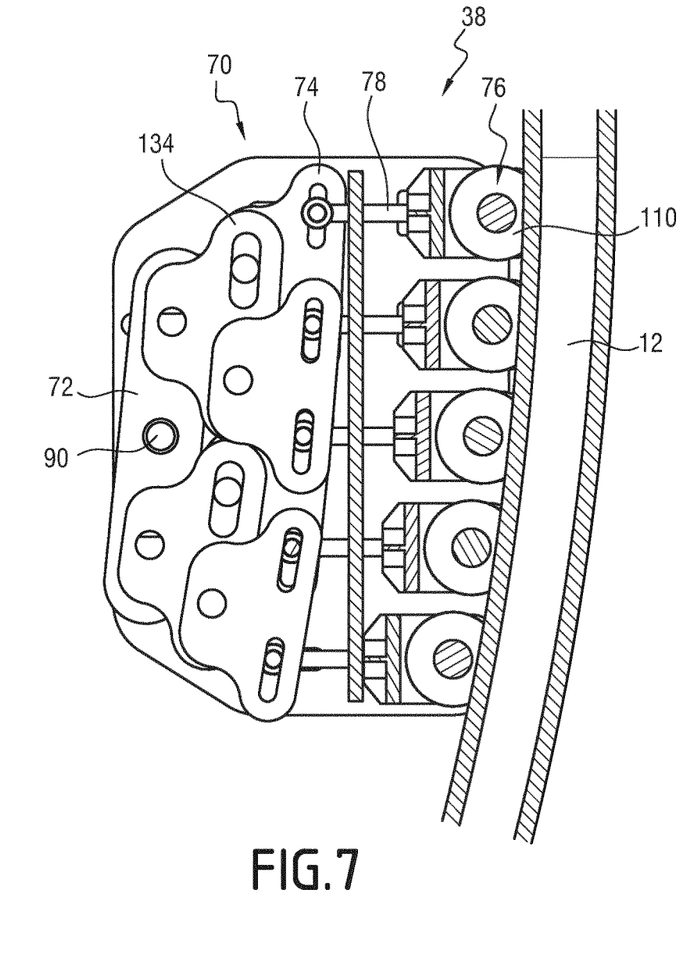
FIG. 7 is a view similar to FIG. 3 illustrating a fourth deflector according to the invention.

The deflector 38 of FIG. 7 differs from the deflector 38 of FIGS. 2 and 3 by the use of an additional rotating member 76. Tertiary pivoting members 134 pivotably connect the intermediate member 72 with each secondary pivoting members 74. The tertiary pivoting members 134 have a shape similar to the shape of the secondary pivoting members 74. They are each hinged on one side to the intermediate member 72 and on the other side to a secondary pivoting member 74.

The number of rotating members 76 can be increased by introducing more intermediate pivoting members 74, 134.

Figure 8:
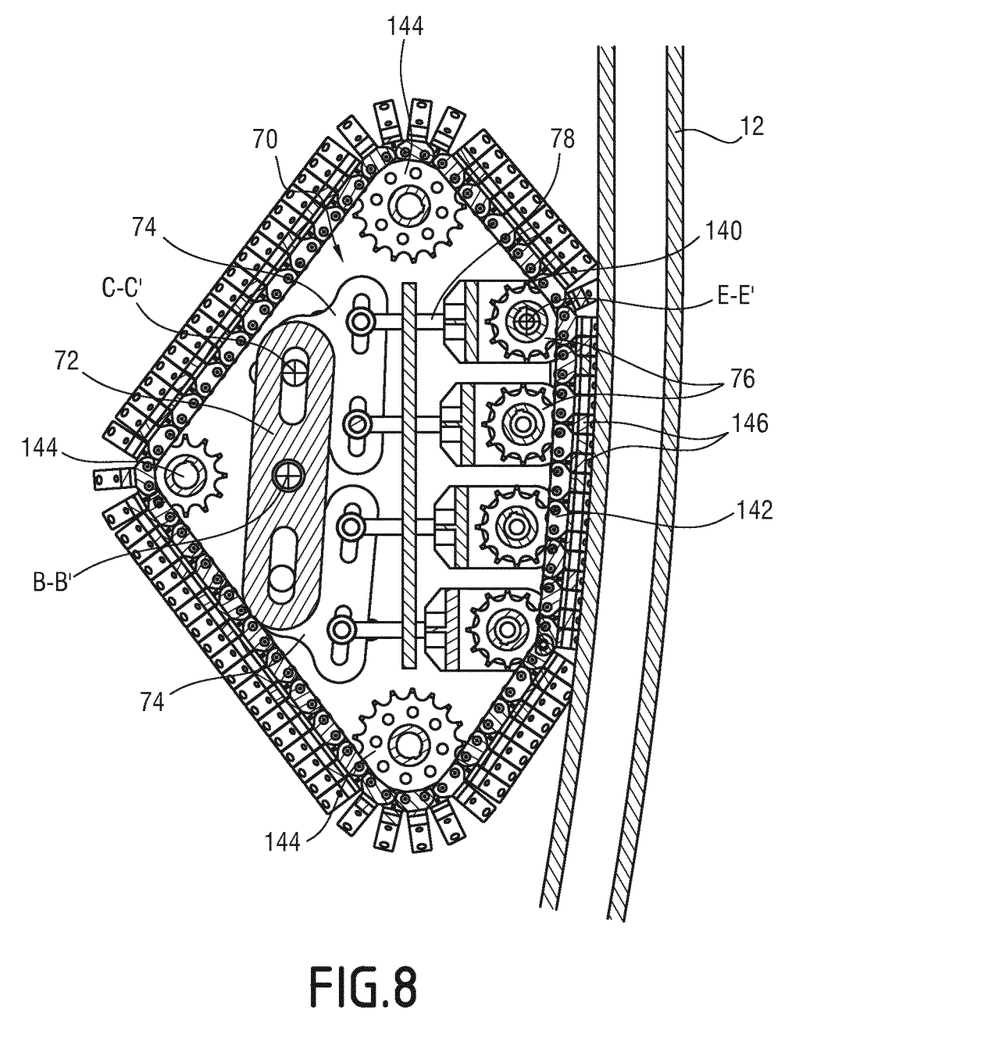
FIG. 8 is a view similar to FIG. 3 illustrating a fifth deflector according to the invention.

The deflector 38 of FIG. 8 differs from the deflector 38 of FIGS. 2 and 3 in that the rotating members 76 do not directly contact the line 12. Each rotating member 76 has peripheral teeth 140 around the outer circumference of the rotating member 76. The deflector 38 further comprises an endless member 142 meshing with the teeth 140 of the rotating members 76 and with fixed tooth wheels 144 surrounding the support 70.

The endless member 142 here comprises a chain. The endless member 142 preferentially carries pads 146 defining grooves for guiding the line 12.

The operation of the deflector 38 of FIG. 8 only differs from the operation of the deflector 38 shown in FIG. 2 by the contact of the line 12 with the pads 146 on the endless member 142, which transmit their movement to the rotating members 76.

The deflector 38 has been described above in an offshore line laying installation 10. In a variant, it is used offshore in a line recovery installation, a drilling installation, an offshore platform. In another variant, it is used onshore.

In a variant (not shown), the support 70 defines a slot 92, the intermediate member 72 comprising a rod 96 inserted in the slot 92.

In another variant (not shown), the connecting member 78 defines an oblong hole 102, the secondary pivoting member 74 comprising a pivot 106 inserted in the oblong hole 102.

In another variant (not shown), a protrusion 120 is connected to the support 70, the rotating member 76 defining a guiding slide 122 receiving the protrusion 120.

As shown in particular in FIGS. 2 to 4, the rotation axis D-D' of each rotating member 76 is fixed with regards to the support 70.

The invention claimed is:

1. A deflector intended to guide a line, the deflector comprising:
    a support;
    an intermediate member pivotally mounted in the support around a first rotation axis;
    at least a secondary pivoting member pivotally connected to the intermediate member around a second rotation axis parallel to the first rotation axis;
    for each secondary pivoting member, at least a pair of rotating members, each rotating member being connected to the secondary pivoting member;
    the deflector comprising, for each rotating member:
    a guiding mechanism, for guiding each rotating member in translation with regard to the support along a translation axis non parallel to the first rotation axis; and
    a first connecting member pivotally mounted with regards to the secondary pivoting member, the rotating member being rotatably mounted on the first connecting member around a rotating member rotation axis.

2. The deflector according to claim 1, comprising at least two secondary pivoting members, mounted on opposite sides of the intermediate member in reference to the first rotation axis, each secondary pivoting member being connected to at least a pair of rotating members.

3. The deflector according to claim 1, comprising, for each secondary pivoting member, a second connecting member,
    wherein the first and second connecting members are pivotally mounted on opposite sides of the secondary pivoting member.

4. The deflector according to claim 1, wherein one of the intermediate member and of the support defines a slot, the other one of the intermediate member and of the support comprising a rod inserted in the slot.

5. The deflector according to claim 1, wherein, for each connecting member, one of the secondary pivoting member and of the connecting member defines an oblong hole, and the other one of the connecting member and of the secondary pivoting member comprising a pivot inserted in the oblong hole.

6. The deflector according to claim 5, wherein the support defines an auxiliary guiding path configured to guide the pivot in translation.

7. The deflector according to claim 1, wherein the guiding mechanism comprises, for each rotating member, at least a protrusion connected to one of the rotating member and of the support, the other one of the rotating member and of the support defining a guiding slide receiving the protrusion, the guiding slide extending along the translation axis.

8. The deflector according to claim 1, wherein the support comprises two side plates and a transverse cross member connecting the side plates, the intermediate member, the at least one secondary pivoting member, and the at least one pair of rotating members being received between the two side plates.

9. The deflector according to claim 1, comprising at least a tertiary pivoting member inserted between the intermediate member and the secondary pivoting member, the tertiary pivoting member being pivotally connected to the intermediate member and to the secondary pivoting member.

10. The deflector according to claim 1, wherein the guiding mechanism comprises at least an adjustable stop, configured to block the translation of the rotating member along the translation axis.

11. The deflector according to claim 1, comprising at least a sensor configured to measure the position of the rotating member along the translation axis.

12. The deflector according to claim 1, wherein each rotating member defines a groove for receiving the line.

13. The deflector according to claim 1, wherein each rotating member comprises peripheral teeth, the deflector comprising an endless member engaged with the teeth of each rotating member.

14. A line guiding assembly in an offshore or onshore or subsea installation, the line guiding assembly comprising:
    a central supporting ring defining a central lumen configured to receive a line therethrough;
    two supporting beams, mounted free in rotation on the central ring, the supporting beams laying on an upper supporting surface defined on the central ring, the supporting beams protruding radially beyond the outer circumference of the central ring; and
    a deflector according to claim 1, carried by each supporting beam.

15. The line guiding assembly according to claim 14, comprising two parallel supporting beams, each supporting beam laying on an upper supporting surface of the central ring, and
    a cross member connecting the two parallel supporting beams,
    wherein the deflector is mounted between the two parallel supporting beams.

* * * * *